United States Patent
Böttger et al.

(10) Patent No.: US 8,677,649 B2
(45) Date of Patent: Mar. 25, 2014

(54) LARGE-SCALE LYOPHILIZATION DEVICE

(75) Inventors: Frank Böttger, Ravensburg (DE); Martin Häuptle, Wald (DE)

(73) Assignee: Arzneimittel GmbH Apotheker Vetter & Co. Ravensburg, Ravensburg (DE)

( * ) Notice: Subject to any disclaimer, the term of this patent is extended or adjusted under 35 U.S.C. 154(b) by 567 days.

(21) Appl. No.: 12/999,021

(22) PCT Filed: Jun. 16, 2009

(86) PCT No.: PCT/EP2009/004312
§ 371 (c)(1),
(2), (4) Date: Dec. 14, 2010

(87) PCT Pub. No.: WO2009/153017
PCT Pub. Date: Dec. 23, 2009

(65) Prior Publication Data
US 2011/0099836 A1    May 5, 2011

(30) Foreign Application Priority Data
Jun. 19, 2008    (DE) .......................... 10 2008 030 269

(51) Int. Cl.
*F26B 5/06*    (2006.01)

(52) U.S. Cl.
USPC ............... 34/284; 34/287; 34/92; 435/287.2; 356/428; 424/1.21

(58) Field of Classification Search
USPC ........ 34/84, 27, 381, 413, 497, 92; 435/4, 13, 435/287.2; 356/427, 428, 335; 424/1.65, 424/1.17, 1.21
See application file for complete search history.

(56) References Cited

U.S. PATENT DOCUMENTS

| | | | | |
|---|---|---|---|---|
| 3,627,423 A * | 12/1971 | Knapp et al. | ................... | 356/340 |
| 5,444,480 A * | 8/1995 | Sumita | ........................ | 348/127 |
| 5,719,679 A * | 2/1998 | Shimizu et al. | ............... | 356/428 |
| 2006/0053652 A1* | 3/2006 | Gyory et al. | .................... | 34/284 |
| 2011/0099836 A1* | 5/2011 | Bottger et al. | .................. | 34/287 |
| 2012/0057018 A1* | 3/2012 | Arp | ................................ | 348/86 |

FOREIGN PATENT DOCUMENTS

| | | | | |
|---|---|---|---|---|
| DE | 1178787 B | 9/1964 | | |
| DE | 20214474 | 3/2004 | | |
| DE | 10310632 A1 | 4/2004 | | |
| DE | 102008030269 A1 * | 12/2009 | ............. | G03B 15/00 |
| EP | 12443 A1 * | 6/1980 | ............... | A61K 6/02 |
| JP | 2002014049 A * | 1/2002 | ............. | G01N 21/90 |
| JP | 2004501334 A | 1/2004 | | |
| JP | 2006507540 A | 3/2006 | | |
| WO | WO 2010132634 A1 * | 11/2010 | | |

OTHER PUBLICATIONS

NPL google search for pharmatceutical freeze dryers on Jul. 26, 2013.*

(Continued)

*Primary Examiner* — Steve M Gravini
(74) *Attorney, Agent, or Firm* — Harness, Dickey & Pierce, P.L.C.

(57) ABSTRACT

A device for large-scale lyophilization of pharmaceutical solutions in medical hollow bodies, includes a lyophilization device and at least one camera. Images of at least one pharmaceutical solution to be lyophilized are recorded by the at least one camera. The images may be used for controlling and/or monitoring the lyophilization process.

27 Claims, 1 Drawing Sheet

(56) References Cited

OTHER PUBLICATIONS

NPL yahoo search for drug freeze dryers on Jul. 26, 2013.*
NPL bing search for pharmatceutical lyophilization on Jul. 26, 2013.*
Good Pharmaceutical Freeze-Drying Practice by Peter Cameron, 1996 (cover and Library of Congress information only).*
English Translation of the International Preliminary Report on Patentability Chapter I, issued Jan. 18, 2011, incorporating the English Translation of the Written Opinion of the International Searching Authority, from the corresponding International Application PCT/EP2009/004312, mailed Aug. 9, 2010 (6 pages).
International Search Report and Written Opinion of the ISA, ISA/EP, mailed Aug. 9, 2010.
First Office Action regarding China Patent Application No. 2011-513940 mailed Jul. 2, 2013. Translation provided by Suzuye & Suzuye.

* cited by examiner

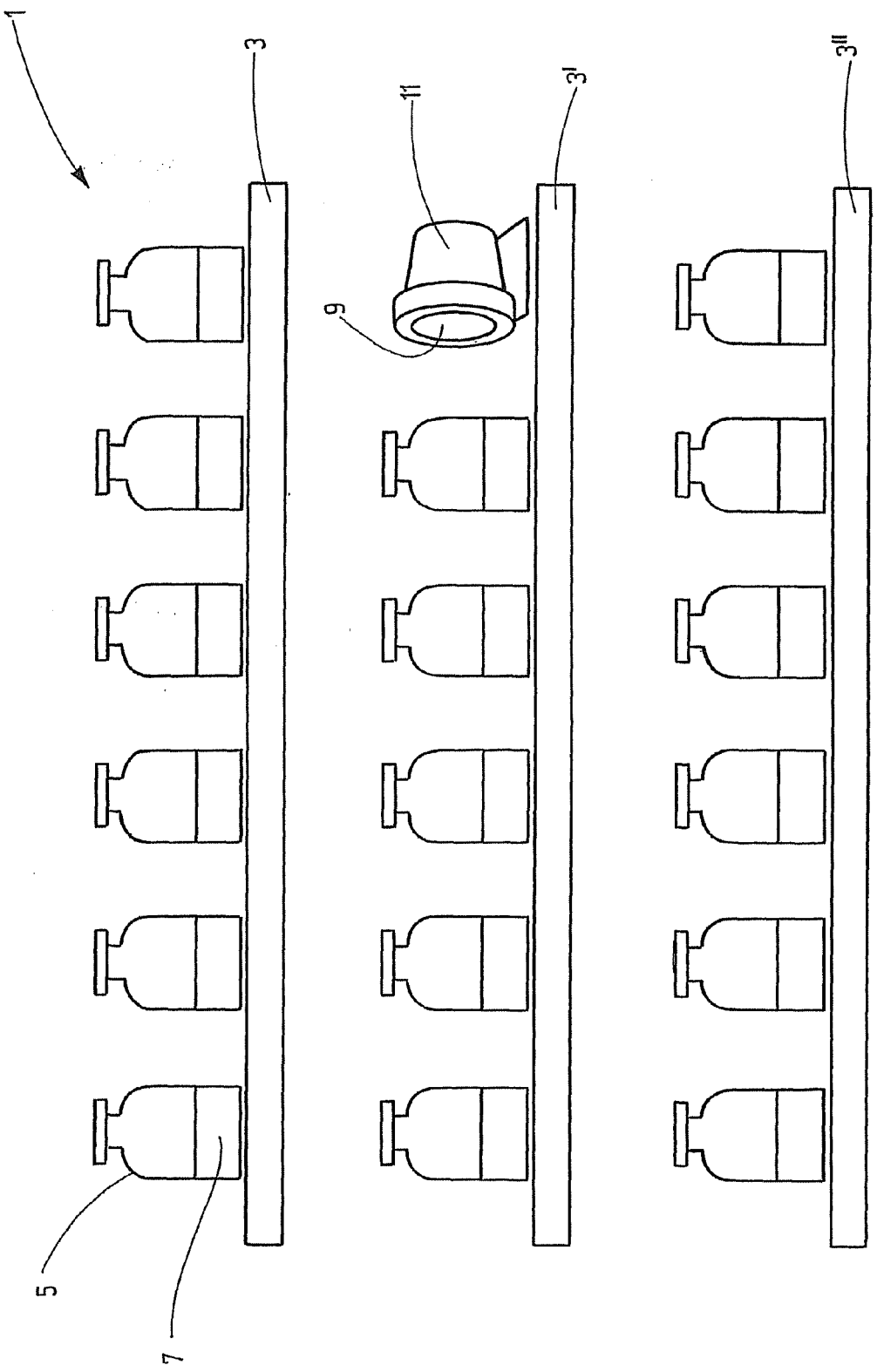

LARGE-SCALE LYOPHILIZATION DEVICE

CROSS-REFERENCE TO RELATED APPLICATIONS

This application is a 371 U.S. National Stage of International Application No. PCT/EP2009/004312, filed Jun. 16, 2009. This application claims priority to German Patent Application No. 10 2008 030 269.4, filed Jun. 19, 2008. The disclosures of the above applications are entirely incorporated by reference herein.

FIELD

The invention relates to a device for large-scale lyophilization of pharmaceutical solutions in medical hollow bodies. The invention further relates to a method for monitoring and/or controlling the large-scale lyophilization of pharmaceutical solutions in medical hollow bodies.

BACKGROUND

Devices for large-scale lyophilization of pharmaceutical solutions in medical hollow bodies are known. For economic reasons, the lyophilization process takes place in a temperature range which is as high as possible, but which does not allow thawing or loss of structure of the frozen product matrix. To ensure that the product temperature remains below a defined limit, which depends on the substance to be lyophilized, temperature sensors which are used for characterization and control of the lyophilization cycle are typically introduced into the product. It is disadvantageous that the sensors, on account of their own heat capacity, may influence the temperature variation or distort the drying rate. For this reason, lyophilization processes are frequently designed in such a way that a sufficient safety margin is maintained with regard to the temperature. This means that the process is carried out at an unnecessarily low temperature, resulting in a decreased drying rate. Therefore, in many cases the process lasts much longer than would be necessary if operations could be carried out at the highest possible temperature range. The danger in exceeding a certain temperature limit lies in the fact that the cake formed by the substance to be lyophilized may collapse when the atmosphere of the lyophilizer is selected to be too humid, or the temperature of the frozen material is too warm. Both process parameters, i.e., the humidity of the atmosphere in the lyophilizer and the product temperature, are a function of the saturated vapor pressure of the substance to be lyophilized. Therefore, to avoid collapse of the cake, before starting a large-scale lyophilization it is important to establish process parameters which consistently ensure success of the process. Examples of such process parameters include the product temperature or the temperature of the shelves of the lyophilization unit, the pressure in the lyophilizer, the humidity of the atmosphere within the lyophilizer, the change of these parameters as a function of time over the entire process, and, not least of all, the total duration of the process. It is understood as a matter of course that each of the values to be set is a function of the specific substance to be lyophilized. Thus, if a lyophilization cycle is to be developed for a substance for which there is no previous experience regarding lyophilization, the relevant parameters must be experimentally determined. For this purpose miniaturized lyophilization units may be provided, which may be placed on the specimen stage of a microscope. The course of the lyophilization may be observed, either with the naked eye or using a camera, through the lens of the microscope and a light-transmitting wall of the miniaturized lyophilization unit. In this manner, according to the principle of trial and error, preferably in multiple test series, the process parameters may be determined for which a cake of the lyophilization material collapses, and for which a successful process takes place. The process parameters determined in this way, in particular in the form of limiting parameters to be maintained, preferably taking a safety margin into account, may then be transferred to the large-scale lyophilization; once again, the temperature sensors described above may be used for characterizing and controlling the process. However, as stated, since the temperature sensors adversely affect the process itself, it would be desirable to have an option for process characterization and control which on the one hand does not require direct contact with the lyophilization material, and on the other hand does not adversely affect the process itself. It would also be desirable for the new option for process characterization and control to allow online monitoring in the sense that evaluatable criteria for controlling or regulating the process parameters may be used during the lyophilization process, so that the process parameters may consistently be maintained in an optimal range without having to use limiting parameters determined beforehand in a complicated and laborious manner in separate experiments.

SUMMARY

The object of the invention, therefore, is to provide a device which is able to observe, characterize, monitor, and/or control the lyophilization cycle without it being possible to come into direct contact with the lyophilization material or to adversely affect the process. A further aim is to allow online monitoring, control, and/or regulation of the process parameters on the basis of criteria which may be evaluated during the lyophilization cycle, so that use of limiting parameters determined beforehand in separate, independent experiments is not necessary, and the process parameters may be consistently maintained in an optimal range.

The underlying object of the invention is achieved by a device having a lyophilization unit and at least one camera, wherein images of a pharmaceutical solution to be lyophilized may be recorded by the at least one camera. The invention is characterized in that the images may be used for controlling and/or monitoring the lyophilization process. Thus, the images recorded by the camera are not primarily used to be able to retrospectively attribute the success or lack of success of the process to a selection of given process parameters, but, rather, are used to allow the course of the process to be actively monitored and/or controlled. Thus, during the overall process it is possible to record images of the substance to be lyophilized, which may be evaluated with regard to whether a collapse of the lyophilization material is imminent, or with regard to the development of the material in the course of the process. For example, a technician may monitor the images on a monitor, and make regulating or controlling interventions in the process as needed. For this purpose, directly during the lyophilization the technician may vary the process parameters such as pressure, temperature, humidity in the atmosphere of the lyophilizer, and the time periods and durations of the individual phases of the process, and make adjustments based on the information obtained from the images. It is thus possible to perform online monitoring of the lyophilization. In this manner the process parameters may be brought more closely to the physical limit defined by the product characteristics. For example, a maximum possible product temperature may be selected for which the drying time is much shorter than in conventional devices, using a safety margin of a given temperature. In particular, it is not necessary in prior independent experiments to determine limiting parameters, which are then maintained taking a safety margin into account. Instead, the state of the lyophilization material, which may be determined based on the images of the substance to be lyophilized, is used as the criterion for process control, so that, without prior knowledge of experimental limiting parameters, it is possible to carry out the process over its entire duration close to the physically possible limit. As a result, the drying process is much more economical, since a larger substance quantity may be lyophilized per unit time, and complicated tests performed beforehand for determining limiting parameters may be dispensed with. At the same time, the risk of adversely affecting the product is minimized.

A device is also preferred which is characterized by provision of an evaluation unit which evaluates the images. In this exemplary embodiment it is not necessary for a technician to observe the lyophilization process. Instead, an evaluation unit may be provided which, using an image evaluation program, for example, monitors and evaluates the images provided by the at least one camera.

In this regard, a device is also preferred in which the evaluation unit is used for changing parameters of the lyophilization process. The evaluation unit, for example using an image evaluation program, evaluates the images provided by the at least one camera, and assesses whether it may be necessary to vary parameters of the drying process in order to ensure the desired product quality. If this is the case, the evaluation unit may initiate an appropriate change of the process parameters so that they are once again in a value range which guarantees the desired product quality.

A device is also preferred in which, on the basis of the evaluation of the images, signals may be transmitted from the evaluation unit to a control device of the lyophilization unit, and on the basis of these signals the parameters of the lyophilization process may be changed. Thus, in this exemplary embodiment, in addition to the evaluation unit a control device is provided which controls the lyophilization unit or the lyophilization process. The evaluation unit evaluates the images of the substance to be lyophilized which are provided by the at least one camera, and in particular performs an assessment of the images. On the basis of this assessment, signals may be transmitted from the evaluation unit to the control device which result in a change in the parameters of the lyophilization process. The aim is thus to ensure that the process parameters are consistently in a value range which guarantees a desired product quality.

A further object of the invention is to provide a method which allows monitoring and/or control of the large-scale lyophilization of pharmaceutical solutions in medical hollow bodies without having to make direct contact with the substances to be lyophilized, or without the process being adversely affected by the device used within the scope of the method. A further aim is for the method to allow online monitoring and/or control or regulation of the lyophilization process, as a result of which the process may be consistently maintained close to the possible physical limit. By using criteria which may be evaluated during the lyophilization process, the aim is to allow control or regulation of the process parameters without having to use limiting parameters, determined beforehand in complicated test series, while maintaining a safety margin.

This object is achieved by a method providing a lyophilization unit and at least one camera. The at least one camera records images of at least one pharmaceutical solution to be lyophilized. The method is characterized in that these images are used for controlling and/or monitoring the lyophilization process. This may be carried out, for example, by a technician monitoring the images on a monitor during the process, and changing the process parameters as needed. The evaluation or assessment of the images recorded by the at least one camera provides criteria, on the basis of which online monitoring of the lyophilization process is possible. Thus, the state of the lyophilization material is observable at any point in time in the process, thus allowing the process parameters to be brought close to the possible physical limit. In this regard, it is not necessary to use limiting parameters determined beforehand in complicated test series while maintaining a safety margin; instead, the optical online monitoring allows dynamic control or regulation of the lyophilization process solely on the basis of the optically determined instantaneous state of the lyophilization material.

A method is also preferred in which the images are evaluated using an evaluation unit. The images do not have to be evaluated by a technician; rather, they are preferably evaluated by an image processing program using software, and assessed with regard to the product quality to be ensured.

A method is preferred in which parameters of the lyophilization process may be changed using the evaluation unit. Based on the assessment of the images provided by the at least one camera, in this case the parameters of the lyophilization process may thus be adjusted in such a way that a desired product quality is ensured.

Lastly, a method is also preferred in which, based on the evaluation of the images, signals are transmitted from the evaluation unit to a control device of the lyophilization unit, on the basis of which the parameters of the lyophilization process are changed. The images provided by the at least one camera are thus evaluated by the evaluation unit and in particular assessed with regard to the desired product quality, and on the basis of this assessment signals are transmitted from the evaluation unit to a control device of the lyophilization unit, the signals being used to change the parameters of the lyophilization process in such a way that a desired product quality may be maintained.

BRIEF DESCRIPTION OF THE DRAWING

The invention is explained in greater detail with reference to the drawing.

The single FIGURE schematically shows the interior 1 of a device for large-scale lyophilization of pharmaceutical solutions in medical hollow bodies. As an example, three shelves 3, 3', 3" are indicated, which may preferably be temperature-equilibrated to allow freezing of the substances to be lyophilized in the interior 1 at the start of the lyophilization process, and also during the lyophilization process to allow the quantity of heat necessary for sublimation of the solvent to be introduced into the medical hollow body and thus indirectly into the substances. Medical hollow bodies, in the present case designed as vials 5, are provided on the shelves 3, 3', 3". These vials contain a substance 7 to be lyophilized. A camera 9 is provided, which by way of example is situated on the middle shelf 3', and which is able to record images of at least one of the pharmaceutical solutions or substances 7 to be lyophilized.

DETAILED DESCRIPTION

In the exemplary embodiment illustrated, only one camera 9 is provided on the middle shelf 3'. When the process parameters have the same values at any location in the interior 1, in principle it is possible, using the camera 9, to observe one vial 5 containing a substance 7. However, multiple cameras 9 may also be provided which record images of the observed vial 5 and the observed substance 7 from various directions. In this manner it may be ensured that the frozen substance 7, for example, is not locally thawed on a side which is not observed by a camera 9.

Because the process parameters are typically different, at least slightly, on the various shelves 3, 3', 3", it may be practical to provide at least one camera 9 on each of the shelves 3, 3', 3" which records images of at least one vial 5 containing a substance 7. This ensures that the lyophilization process is uniformly monitored on all shelves 3, 3', 3", and may be controlled as needed. In this case it is not possible for the process parameters on one shelf 3, 3', 3" under observation by a camera 9 to be in an optimal value range while deviating from the optimal value range on another shelf 3, 3', 3", which would thus prevent the desired product quality from being guaranteed. Of course, it is also possible for multiple vials 5 containing substances 7 to be recorded by multiple cameras 9. The cameras 9 may be situated in such a way that images of one or more vials 5 and substances 7 are recorded from various directions.

The camera 9 may be designed as an analog camera, a digital camera, a macro camera, preferably a camera having a macro lens, or a webcam. The images provided by the at least one camera 9 are preferably electronically recorded and evaluated. This is particularly simple when the camera 9 is a digital camera. The camera 9 is preferably miniaturized, so that it has small space requirements and does not require much room in the interior 1, thus making space available for the medical hollow bodies.

The camera 9 is preferably actuated in intervals, but may also continuously record image sequences, i.e., movies. However, it is advantageous to not operate the camera 9 continuously, and instead to record the images in intervals. Heating of the camera 9 due to operation is therefore much less, thus minimizing the heat emitted to the interior 1 by the camera. The time periods for recording the images may be synchronized using relevant process parameters. Thus, it may be provided that, for example, a pressure increase in the interior 1 results in actuation of at least one camera 9. Of course, other process parameters may also be used for timing the recording of camera images. On the other hand, it is possible to record the images in either fixed or variable intervals, with the control of the image recording being integrated into a control device of the lyophilizer. However, a technician may also actuate the recording of images at regular intervals or as needed in order to then be able to evaluate same.

Typically, no lighting unit is provided in the interior 1 of a lyophilizer which allows illumination of the medical hollow bodies during the process. If use is made of the visible portion of the electromagnetic spectrum for recording the images by the at least one camera 9, a lighting unit must accordingly be provided in the interior 1 so that sufficient light is present to record the desired images. This lighting unit is preferably designed as a cold light source so that the temperature of the interior 1 is influenced as little as possible.

The camera 9 preferably includes the lighting unit. This has the advantage that the lighting unit may be connected to the camera 9 in such a way that the lighting unit always precisely illuminates the region recorded by the camera 9. It is particularly advantageous for the lighting unit to be integrated into the at least one camera 9. A particularly compact design may be achieved in this way.

In conjunction with the use of a camera 9, it may be problematic that when the pressure in the interior 1 decreases, substances outgas from the material of the camera 9 which result in increased pressure in the interior 1. If the camera 9 has a high outgassing rate, the pumps used for evacuating the interior 1 possibly may not be able to pump out the resulting gas load. In this regard, not only is outgassing of camera materials possibly containing plastic a problem, but also the formation of so-called "virtual leaks," as the result of which, for example, gas may diffuse very slowly from the interior of the camera 9 through screw connections at the outer wall of the camera 9, resulting in a lasting increase in pressure in the space 1. It may typically take a very long time for the pressure to be equalized through such virtual leaks. It may also be problematic when the interior of the camera 9 has a higher pressure than the external atmosphere. This could even result in damage to the camera. For this reason it may be practical to provide the camera 9 in a housing 11 which accommodates the camera and preferably encloses it in a vacuum-tight manner. In that case standard pressure may be present inside the housing 11, while the pressure in the interior 1 of the lyophilizer is not affected. Thus, on the one hand the camera is protected, and on the other hand an influence of pressure in the interior 1 is eliminated. It is understood as a matter of course that for this purpose the housing 11 must have a vacuum-tight design.

It has been discussed above that the camera 9 may heat up during operation. To prevent this heat from being emitted to the atmosphere in the interior 1, it may be provided that the at least one camera 9 has a thermally insulated design. The vacuum-tight housing 11 which accommodates the camera 9 may preferably also be thermally insulated.

If the lyophilization is to be carried out under sterile conditions, it is of great advantage for the at least one camera 9 and/or the at least one vacuum-tight housing 11 to have a low particle density. It is also preferable for the at least one camera 9 and/or the at least one vacuum-tight housing 11 to be sterilizable. In this regard it is particularly advantageous when the housing 11 and/or the camera 9 is/are situated not on a shelf 3, 3', 3", but instead fastened, for example clipped, directly to a cartridge holding the medical hollow bodies or vials 5. In this case the camera 9, i.e., the housing 11, together with the cartridge may go through the entire sterilization and filling or lyophilization process, so that in each case at least one camera 9 or housing 11 may be permanently associated with a cartridge, and in principle does not have to be separated from same. It is particularly advantageous for data or power to be transmitted wirelessly to and from the camera 9. Thus, in principle the cartridges may be handled exactly as if no camera 9 were connected to the cartridge. The camera 9 may, for example, be provided with an antenna for wireless data transmission, and a battery for the power supply. An accumulator may also be used in this regard. On the other hand, an inductive transmission path may also be provided which transmits power as well as data from an external source to the camera 9, and in the reverse direction. An optical transmission path is also possible.

Multiple cameras 9 may be accommodated in one housing 11; however, a separate housing 11 may also be associated with each camera 9.

The at least one camera 9 may also be designed as an endoscopic system which, for example, may be introduced into a vial 5. In this manner the camera 9 may be brought particularly close to the substance 7 to be lyophilized, for example to be able to record highly detailed images of the substance 7. On the other hand, such an endoscopic system may also be used to introduce an optical fiber through a leadthrough into the interior 1 of the lyophilizer, via which the images may be relayed from the interior 1 to an external camera 9. Thus, the camera 9 may be situated completely outside the interior 1, where it does not have to meet such stringent demands for vacuum-tightness, particle density, or sterility. Multiple optical fibers may also be distributed in the interior 1, which are guided out from the interior 1 via leadthroughs and optionally associated with various cameras 9 or a single camera 9. If a single camera 9 is provided, it may be connected to a device which is able to switch in a clocked manner between the image information items delivered by the various optical fibers, thus allowing the camera 9 to record images in the interior 1 at various times from various locations or from various directions. A further advantage of such optical fibers is that they require a particularly small amount of space, so that more space remains for medical hollow bodies.

On the other hand, if the at least one camera 9 is situated in the interior 1 of the lyophilizer, the camera is preferably designed in such a way that it may be used in a temperature range of −60° C. to +60° C. This ensures the functionality of the camera 9 during the entire process.

The at least one camera 9 may also be designed in such a way that it makes use of the invisible range of the electromagnetic spectrum for recording images. To this end, it must be sensitive in this range. The camera 9 may, for example, record thermal images when it is sensitive to the infrared portion of the electromagnetic spectrum. This may be advantageous since on the one hand a lighting unit may be dispensed with, and on the other hand the product temperature of the substance may be represented in a spatially resolved manner by means of false colors. Supplementary information is thus obtained concerning the structure of the substance 7 by detecting the location-dependent variation of the temperature within the substance 7.

The images of at least one pharmaceutical solution or substance 7 to be lyophilized recorded by the at least one camera 9 may be used for controlling and/or monitoring the lyophilization process. For this purpose, it may be provided that a technician evaluates the images, and during the process optionally adjusts the process parameters such as temperature, pressure, humidity, or the change in these parameters over time, or also adjusts the overall process duration based on the information obtained from the images. On the other hand, an evaluation unit may be provided which with the aid of an image evaluation program, for example, evaluates the images and in particular assesses them with regard to a desired product quality. Based on this evaluation or assessment, changes may then be made to the parameters of the lyophilization process, preferably automatically. To this end, on the basis of the evaluation or assessment of the images the evaluation unit may transmit signals to a control device of the lyophilization unit which are suitable for changing the parameters of the lyophilization process in such a way that a desired product quality is achieved. The control device may also be used for timing the recording of images by the at least one camera 9. The recordings may also be actuated by changes in the product parameters.

The method for monitoring and/or controlling the large-scale lyophilization of pharmaceutical solutions in medical hollow bodies is explained in greater detail below. Medical hollow bodies, for example vials 5, containing pharmaceutical solutions or substances 7 to be lyophilized are introduced into the interior 1 of a lyophilization unit. At least one camera records images of at least one of the vials 5 or substances 7, the images being used for controlling and/or monitoring the lyophilization process. As described above, a technician, or an evaluation unit which preferably includes an image evaluation program, may be used for this purpose. Based on the images, the technician or the evaluation unit monitors the course or progress of the lyophilization process, and intervenes in same as needed by changing process parameters. For this purpose it is necessary to assess the images recorded by the at least one camera 9 with regard to a desired product quality. Depending on this assessment, the parameters of the lyophilization process may then be changed as needed. Based on the evaluation of the images, in a particularly advantageous manner signals are transmitted from the evaluation unit to a control device of the lyophilization unit, on the basis of which the parameters of the lyophilization process are changed as needed.

Accordingly, it has been shown that by use of the device according to the invention or the method according to the invention it is possible to operate a lyophilization unit in the highest possible temperature range. In addition, other parameters may be brought more closely to the physical limit defined by the product characteristics. This results in shorter drying times, and thus increased cost-effectiveness of the lyophilization process, while at the same time the risk of reduced product quality is minimized. The device and the method operate without contacting the pharmaceutical solutions to be lyophilized, and do not result in adverse effects on the process. In addition, the device and the method allow online monitoring of the overall course of the process, as the result of which the entire process may not only be monitored, but also controlled. Furthermore, separate, complicated test series, carried out beforehand for determining limiting parameters, may be dispensed with due to the fact that criteria in the form of camera images which may be evaluated exclusively during the lyophilization process are used for monitoring, controlling, and/or regulating the process. This online monitoring ultimately results in reproducible, consistently high product quality, so that in addition the percentage of rejects may be greatly reduced.

The invention claimed is:

1. A device for large-scale lyophilization of pharmaceutical solutions in medical hollow bodies, the device comprising:
    a lyophilization unit; and
    at least one camera for recording images of at least one pharmaceutical solution to be lyophilized, the images adapted to be used for controlling and/or monitoring a lyophilization process, the at least one camera arranged within an interior of the lyophilization unit.

2. The device according to claim 1, further comprising an evaluation unit for evaluating the images.

3. The device according to claim 2, wherein the evaluation unit is operative to change parameters of the lyophilization process.

4. The device according to claim 3, wherein signals are transmitted from the evaluation unit to a control device of the lyophilization unit, and based on the evaluation of the images, the parameters of the lyophilization process are changed in response to the signals.

5. The device according to claim 1, wherein the at least one camera is an analog camera, a digital camera, a macro camera, or a webcam.

6. The device according to claim 1, further comprising a lighting unit.

7. The device according to claim 6, wherein the at least one camera includes the lighting unit.

8. The device according to claim 7, wherein the lighting unit is integrated into the at least one camera.

9. The device according to claim 1, further comprising at least one vacuum-tight housing accommodating the at least one camera and enclosing the at least one camera in a vacuum-tight manner.

10. The device according to claim 1, wherein the at least one camera is operable in a temperature range of −60° C. to 60° C.

11. The device according to claim 9, wherein the at least one camera and/or the at least one vacuum-tight housing have a low particle density.

12. The device according to claim 9, wherein the at least one camera and/or the at least one vacuum-tight housing are thermally insulated.

13. The device according to claim 9, wherein the at least one camera and/or the at least one vacuum-tight housing are sterilizable.

14. The device according to claim 9, further comprising a cartridge, the at least one camera and/or the at least one vacuum-tight housing may be fastened to the cartridge for holding the medical hollow bodies.

15. The device according to claim 1, wherein the at least one camera includes multiple cameras operable to record images of the at least one pharmaceutical solution from various directions.

16. The device according to claim 1, wherein the at least one camera is designed as an endoscopic system.

17. The device according to claim 1, wherein the at least one camera is sensitive in an invisible range of the electromagnetic spectrum.

18. A method for monitoring and/or controlling large-scale lyophilization of pharmaceutical solutions in medical hollow bodies, the method comprising:
providing a lyophilization unit and at least one camera;
arranging a camera within an interior of the lyophilization unit;
recording images of at least one pharmaceutical solution to be lyophilized from within the interior of the lyophilization unit with the at least one camera; and
controlling and/or monitoring a lyophilization process with images from the at least one camera.

19. The method according to claim 18, further comprising evaluating the images using an evaluation unit.

20. The method according to claim 19, further comprising changing parameters of the lyophilization process using the evaluation unit.

21. The method according to claim 20, wherein based on the evaluation of the images, signals are transmitted from the evaluation unit to a control device of the lyophilization unit, on a basis of which the parameters of the lyophilization process are changed.

22. The device according to claim 3, wherein the evaluation unit cooperates with a control device to automatically change parameters of the lyophilization process selected from a group consisting of temperature, pressure and humidity based on information obtained from the images.

23. The device according to claim 22, further comprising an image evaluation program for automatically evaluating the images with regard to a desired product quality.

24. The method according to claim 21, further comprising automatically changing parameters of the lyophilization process selected from a group consisting of temperature, pressure and humidity based on evaluation of the images.

25. The method according to claim 24, further comprising automatically evaluating the images with regard to a desired product quality with an image evaluation program.

26. A device for large-scale lyophilization of pharmaceutical solutions in medical hollow bodies, the device comprising:
a lyophilization unit;
at least one camera for recording images of at least one pharmaceutical solution to be lyophilized, the images adapted to be used for controlling and/or monitoring a lyophilization process;
an evaluation unit for evaluating the images, the evaluation unit operative to change parameters of the lyophilization process, by transmitting signals to a control device of the lyophilization unit such that parameters of the lyophilization process are changed in response to the signals based on evaluation of the images.

27. The device according to claim 26, wherein the evaluation unit cooperates with the control device to automatically change parameters of the lyophilization process selected from a group consisting of temperature, pressure and humidity based on information obtained from the images.

* * * * *